United States Patent
Ead et al.

[11] Patent Number: 6,138,736
[45] Date of Patent: Oct. 31, 2000

[54] FLUID DRIVEN FILM APPLIQUE TOOL

[75] Inventors: Frank M. Ead, Roswell; Jeffrey W. Howard, Kennesaw; Thomas A. Robertson, Lithia Springs, all of Ga.

[73] Assignee: Lockheed Martin Corporation, Bethesda, Md.

[21] Appl. No.: 09/176,925

[22] Filed: Oct. 22, 1998

[51] Int. Cl.⁷ .................................................. B32B 31/00
[52] U.S. Cl. ........................................... 156/579; 156/475
[58] Field of Search ............................. 156/71, 212, 224, 156/229, 285, 475, 493, 494, 579; 411/373, 377, 430, 431

[56] References Cited

U.S. PATENT DOCUMENTS

| | | | |
|---|---|---|---|
| 3,704,647 | 12/1972 | Painaud .................................. | 411/910 |
| 4,747,241 | 5/1988 | Whitman ................................. | 411/377 |
| 4,923,348 | 5/1990 | Carlozzo et al. ....................... | 411/431 |
| 5,129,770 | 7/1992 | Coleman ................................ | 411/377 |
| 5,419,666 | 5/1995 | Best ....................................... | 411/377 |
| 5,755,908 | 5/1998 | Rayburn et al. ........................ | 156/224 |

*Primary Examiner*—James Sells
*Attorney, Agent, or Firm*—Eric R. Katz

[57] ABSTRACT

A hand held, fluid driven film applique tool is disclosed for applying a film having an adhesive backing to a surface having a protrusion. The applique tool comprises a tool head including a hollow cylinder having an open end for receiving the protrusion and a closed end, the hollow cylinder being surrounded by an annular surface which is relatively flat and smooth. An elastomeric plug is slidably received by the hollow cylinder, the plug having a head portion forming the closed end of the hollow cylinder and a fluid pressure surface to which is applied a fluid under pressure to drive the elastomeric plug toward the open end of the hollow cylinder. A spring is provided for biasing the elastomeric plug away from the open end of the hollow cylinder and a switch is included for connecting a source of fluid under pressure to the fluid pressure surface of the elastomeric plug. Further, a handle is furnished for holding the tool. In operation, the tool head is placed over the protrusion so that the open end of hollow cylinder receives at least the protrusion and the film overlying the protrusion and the annular surface stretches and presses the film surrounding the protrusion against the surface. By applying the source of fluid under pressure to the fluid pressure surface, the head portion of the elastomeric plug is driven into contact with the protrusion to press the film firmly against the protrusion to assure that the film is flatly and completely applied at the protrusion.

10 Claims, 2 Drawing Sheets

FLUID DRIVEN FILM APPLIQUE TOOL

BACKGROUND OF THE INVENTION

1. Field of the Invention

The present invention generally relates to a tool for applying films having an adhesive backing to articles and, more particularly to a hand-held, film applique tool useful in applying such film to surfaces having raised protrusion, such as fastener heads or the like, wherein an elastomeric plug is driven by fluid pressure to press the film against the raised protrusion.

2. Background Discussion

A team composed of Lockheed Martin and 3M are investigating the potential benefits of using "paintless" film appliques instead of paint on commercial and military aircraft. These aircraft appliques consist of adhesive films designed to offer potential savings over conventional paint in production costs, support requirements and aircraft weight. They also offer significant environmental advantages, since commercial and military painting are a major source of volatile organic compounds (VOC's).

Paintless aircraft coatings, when properly applied, can withstand forces of up to 5g's and speeds up to Mach 1.4. While the average paint coating lasts approximately 3 years, these paintless coatings last up to 5 years and involve no use of solvents in its application or removal.

Most aircraft are painted frequently. Military aircraft have camouflage repainted every time they move to a different theatre of war and airlines have a different livery painted on them every time they are leased to a new operator. Every time this is done, the aircraft must be isolated in a paint shop to protect employees and the environment from a range of toxic solvents and additives present in every paint as well as other VOC compounds which are heavily used in the application and removal of paint coatings.

The self-adhesive plastic films used by paintless technology are quite similar to Teflon and can be printed with the desired livery, camoflague pattern or miliary markings and cut out to the right shape by a computer for application to the complex contours of a particular aircraft type. These sheet are applied under pressure and have no effect on the flying ability of the aircraft.

The paintless film is peeled off using hot, high-pressure water and disposed of as non-hazardous waste. New film is applied by hand in a manner similar to wallpaper. For application to the aircraft, the film is cut into individual pieces (for example 400 or more) using gore cuts to follow the aircraft's curved surfaces. Butt and lap joints are used and edge sealer applied to prevent peeling. Applique shapes can be stored in computer and cut form flat film on demand, using a plotter/cutter when recoating an aircraft. In addition, the paintless film can be applied during routine maintenance, while other work continues on the aircraft.

Proper application of the paintless film requires uniform adhesion of the film to the surface without wrinkles, tears, tenting or creases. This is particular difficult for aircraft, since aircraft surfaces are studded with fasteners, such as, for example, rivets, screws and the like, which have heads the protrude above the surface of the aircraft. These protrusions tend to create tenting of the paintless film which is unacceptable according to the specification requirements of the film. Moreover, the protrusions make it difficult to apply the proper amount of uniform pressure to the film to assure correct bonding of the film's adhesive backing to the aircraft surface.

Heretofore, application of the paintless films at and around the fastener heads on aircraft surfaces has been achieved by applying pressure to the film with the finger tips of the human hand or using a felt squeegee. This is a very time consuming and labor intensive process which creates non-conforming inconsistences which vary from fastener to fastener.

SUMMARY OF THE INVENTION

Accordingly, it is an object of the present invention to provide a hand-held, fluid driven, film applique tool for applying paintless films to surfaces, such as aircraft surfaces, which have raised protrusions.

It is a further object of the present invention to provide a film applique tool which decrease film application time.

It is a yet another object of the present invention to provide a film applique tool which simplifies application of paintless films around raised protrusion.

Still another object of the present invention is to provide a film applique tool that reduces the risk of tearing the paintless films during application at a raised protrusion on the surface being covered.

One particularly advantageous feature of the present invention is that the film applique tool of the present invention eliminates tenting, provides uniform application of the paintless film in the area around the fastener as well as acceptable film appearance.

Yet another advantageous feature of the present invention is that the film applique tool of the present invention uses fluid pressure to drive an elastomeric plug against the film at the protrusion to force the film into intimate contact with the protrusion. This initiate contact of the film with the protrusion facilitates bonding of the film's adhesive backing to the protrusion and minimizes the risk of tearing the film during application.

Still other advantageous features of the present invention include its simplistic design, lightweight, ease of use and elimination of electrical power for operation.

These and other objects, advantages and features of the present invention are achieved, according one embodiment thereof, by a hand held, fluid driven film applique tool for applying a film having an adhesive backing to a surface having a protrusion.

The applique tool comprises a tool head including a hollow cylinder having an open end for receiving the protrusion and a closed end, the hollow cylinder being surrounded by an annual surface which is relatively flat and smooth. An elastomeric plug is slidably received by the hollow cylinder, the plug having a head portion forming the closed end of the hollow cylinder and a fluid pressure surface to which is applied a fluid under pressure to drive the elastomeric plug toward the open end of the hollow cylinder.

A spring is provided for biasing the elastomeric plug away from the open end of the hollow cylinder and a switch is included for connecting a source of fluid under pressure to the fluid pressure surface of the elastomeric plug. Further, a handle is furnished for holding the tool.

In operation, the tool head is placed over the protrusion so that the open end of hollow cylinder receives at least the protrusion and the film overlying the protrusion and the annual surface stretches and presses the film surrounding the protrusion against the surface. By applying the source of fluid under pressure to the fluid pressure surface, the head portion of the elastomeric plug is driven into contact with the protrusion to press the film firmly against the protrusion to assure that the film is flatly and completely applied at the protrusion.

DETAILED DESCRIPTION OF THE PREFERRED EMBODIMENT(S)

Figure 1:
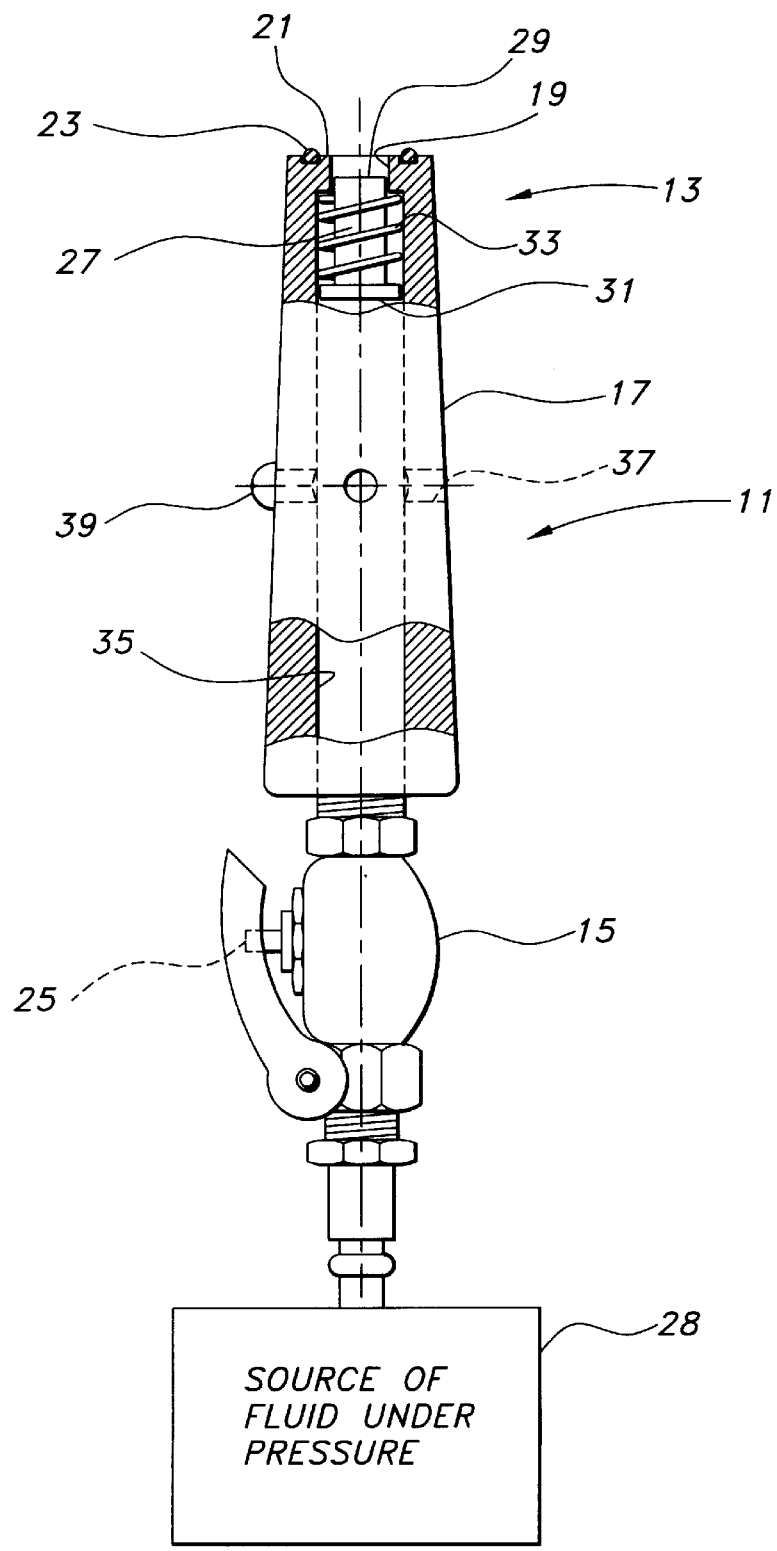
FIG. 1 is side, partially-in-section, view of one embodiment of the film applique tool of the present invention.

Referring to FIG. 1, one embodiment of the hand held, fluid driven film applique tool of the present invention is illustrated generally at 11. The tool 11 comprises a tool head, generally indicated at 13, having a hollow cylinder 19 connected by a shank 17 to a handle 15 for manually holding the tool 11. At the handle 15, a manually operated switch 25 is provided for connecting the hollow cylinder 19 to a source of fluid under pressure 28.

The hollow cylinder 19 has an open end for receiving a protrusion (not shown), such as, the head of a fastener, for example, a screw or rivet and the like and a closed end juxtaposed to the open end. The hollow cylinder 19 is surrounded by an annual surface 21 which is relatively flat and smooth so that it will not deform the film (not shown) to be applied The annual surface 21, in the embodiment of FIG. 1, is provide with an elastomeric O-ring 23.

Figure 2:
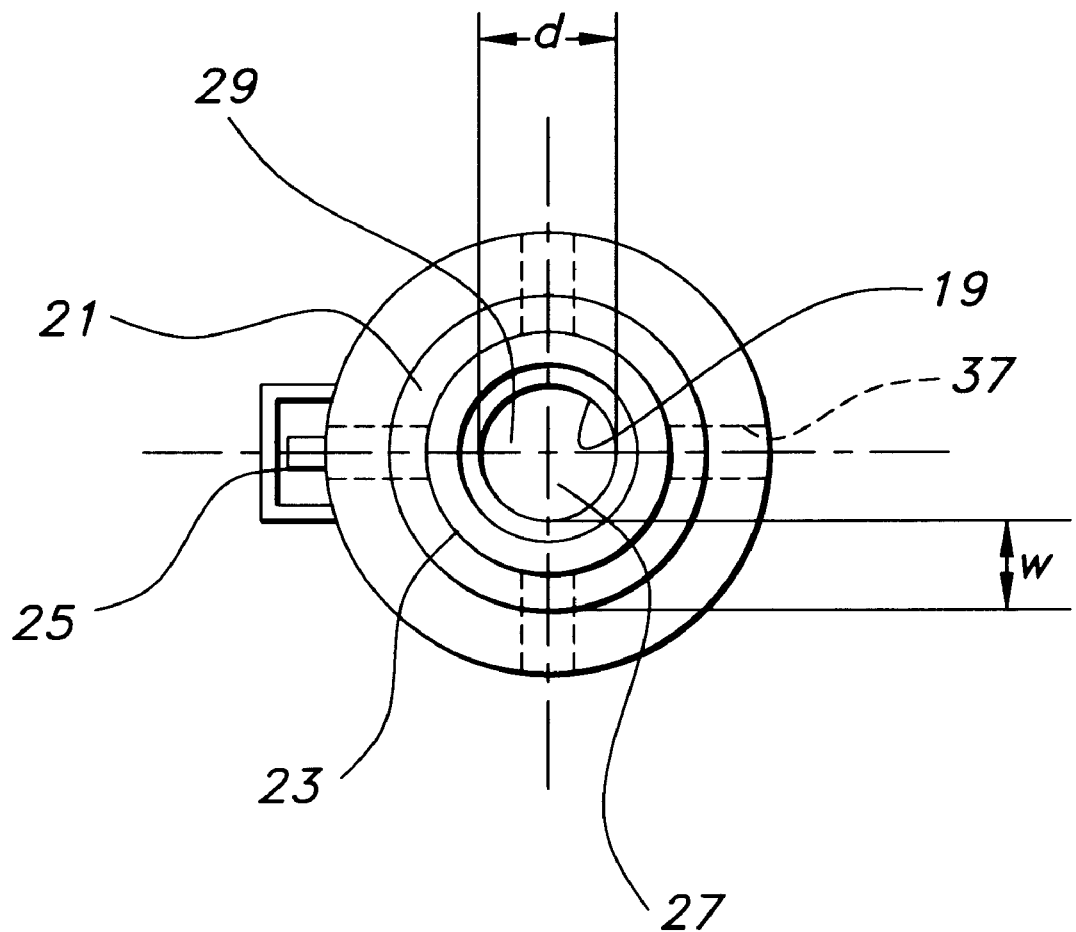
FIG. 2 is a top, planar view of the film applique tool of FIG. 1.

As best seen in FIG. 2, an inner diameter d of the hollow cylinder 19 is at least equal to a diameter of the protrusion plus a thickness of the film to be applied. According to a further embodiment of the present invention, the inner diameter d of the hollow cylinder 19 can further enclose at least some of the aircraft surface local to the periphery of the protrusion, i.e., the fastener head. In addition, the width w of the annual surface 21 is approximately equal to about one quarter to about one half or more of the inner diameter d of the hollow cylinder 19.

An elastomeric plug 27 is slidably received by the hollow cylinder 19, the plug 27 having a head portion 29 forming the closed end of the hollow cylinder 19 and a fluid pressure surface 31 to which is applied the fluid under pressure from the source 28 to drive the elastomeric plug 27 toward the open end of the hollow cylinder 18. Also included is a spring 33 which biases the plug 27 away from the open end of the hollow cylinder 19.

In operation, the tool head 13 is placed over the protrusion so that the open end of hollow cylinder 19 receives at least the protrusion and the film overlying the protrusion and the annual surface 21 stretches and presses the film surrounding the protrusion against the surface. Thereafter, the operator hits the switch 25 to connect the source of fluid under pressure 28 to the fluid pressure surface 33 of the elastomer plug 27. As a result, the head portion 29 of the elastomeric plug 27 is driven into contact with the protrusion to press the film firmly against the protrusion to assure that the film is flatly and completely applied at the protrusion.

The shank 17 is provided with a conduit 35 for conducting the fluid under pressure from the handle 15 to the fluid pressure surface 31 of the elastomeric plug 27. In order to control the pressure of the fluid at fluid pressure surface 31, one or more exhaust channels 37 are formed in the shank 17, for example, by drilling or during forging of the shank 17. The exhaust channels 37 are in fluid communication with the atmosphere to permit the escape of the fluid under pressure prior to reaching the fluid pressure surface. The channels 37 are tapped so that tap screws 39 can be screwed therein to close one or more of the channels 37 to vary the pressure of the fluid at the fluid pressure surface 31.

Although the present invention has been described with particular reference to its preferred embodiments, it should be understood that many variations and modifications will now be obvious to those skilled in that art, and it is preferred, therefore, that the scope of the invention be limited, not by the specific disclosure herein, but only by the appended claims.

What is claimed is:

1. A hand held, fluid driven film applique tool for applying a film having an adhesive backing to a surface having a protrusion, the tool comprising:

a tool head including a hollow cylinder having an open end for receiving the protrusion and a closed end, the hollow cylinder being surrounded by an annular surface which is relatively flat and smooth;

an elastomeric plug slidably received by the hollow cylinder, the plug having a head portion forming the closed end of the hollow cylinder and a fluid pressure surface to which is applied a fluid under pressure to drive the elastomeric plug toward the open end of the hollow cylinder;

a spring for biasing the elastomeric plug away from the open end of the hollow cylinder;

a switch for connecting a source of fluid under pressure to the fluid pressure surface of the elastomeric plug; and a handle for holding the tool;

wherein the tool head is placed over the protrusion so that the open end of hollow cylinder receives at least the protrusion and the film overlying the protrusion and the annular surface stretches and presses the film surrounding the protrusion against the surface; and wherein, by applying the source of fluid under pressure to the fluid pressure surface, the elastomeric plug is driven into contact with the protrusion to press the film firmly against the protrusion to assure that the film is flatly and completely applied at the protrusion.

2. A film applique tool according to claim 1, wherein an inner diameter of the hollow cylinder is at least equal to a diameter of the protrusion plus a thickness of the film to be applied.

3. A film applique tool according to claim 1, wherein an inner diameter of the hollow cylinder is greater than a diameter of the protrusion plus a thickness of the film being applied.

4. A film applique tool according to claim 1, wherein a width of the annular surface is at least equal to about one quarter to about one half of an inner diameter of the hollow cylinder.

5. A film applique tool according to claim 2, wherein a width of the annular surface is at least equal to about one quarter to about one half of the inner diameter of the hollow cylinder.

6. A film applique tool according to claim 3, wherein a width of the annular bottom surface is at least equal to about one quarter to about one half of the inner diameter of the hollow cylinder.

7. A film applique tool according to claim 1, wherein a shank connects the handle to the tool head.

8. A film applique tool according to claim 7, wherein the shank includes a fluid conduit for conducting the fluid under pressure to the fluid pressure surface of the elastomeric plug.

9. A film applique tool according to claim 8, wherein the fluid conduit further include at least one exhaust channel which can be selectively opened and closed to vary a pressure of the fluid at the fluid pressure surface of the elastomeric plug.

10. A film applique tool according to claim 1, further comprising means for varying a pressure of the fluid at the fluid pressure surface of the elastomeric plug.

\* \* \* \* \*